United States Patent [19]
Gan et al.

[11] Patent Number: 5,878,238
[45] Date of Patent: Mar. 2, 1999

[54] TECHNIQUE FOR SUPPORTING SEMI-COMPLIANT PCI DEVICES BEHIND A PCI-TO-PCI BRIDGE

[75] Inventors: Doron Gan; Jeff Savage, both of Austin, Tex.

[73] Assignee: Dell USA, L.P., Round Rock, Tex.

[21] Appl. No.: 908,650

[22] Filed: Aug. 7, 1997

Related U.S. Application Data

[62] Division of Ser. No. 590,461, Jan. 23, 1996.

[51] Int. Cl.⁶ .............................. G06F 1/30; G06F 13/40
[52] U.S. Cl. .......................... 395/308; 395/309; 395/828; 395/183.12
[58] Field of Search ..................................... 395/280–284, 395/306–309, 828–834, 183.12

[56] References Cited

U.S. PATENT DOCUMENTS

| | | | |
|---|---|---|---|
| 5,018,146 | 5/1991 | Sexton | 371/37.1 |
| 5,325,369 | 6/1994 | Kim | 371/29.1 |
| 5,375,211 | 12/1994 | Maruyama et al. | 395/325 |
| 5,379,384 | 1/1995 | Solomon | 395/325 |
| 5,483,468 | 1/1996 | Chen et al. | 364/551.01 |
| 5,555,425 | 9/1996 | Zeller et al. . | |
| 5,560,016 | 9/1996 | Fiebrich et al. . | |
| 5,568,619 | 10/1996 | Blackledge et al. | 395/281 |
| 5,581,714 | 12/1996 | Amini et al. | 395/308 |
| 5,594,873 | 1/1997 | Garrett . | |
| 5,608,876 | 3/1997 | Cohen et al. | 395/281 |
| 5,611,045 | 3/1997 | Basile | 395/184.01 |
| 5,615,323 | 3/1997 | Engel et al. | 395/140 |
| 5,619,728 | 4/1997 | Jones et al. . | |
| 5,632,021 | 5/1997 | Jennings et al. | 395/309 |
| 5,636,342 | 6/1997 | Jeffries . | |
| 5,644,470 | 7/1997 | Benedict et al. | 361/686 |
| 5,689,726 | 11/1997 | Lin | 395/830 |
| 5,692,219 | 11/1997 | Chan et al. . | |

*Primary Examiner*—Ayaz R. Sheikh
*Assistant Examiner*—Jigar Pancholi
*Attorney, Agent, or Firm*—Haynes and Boone, LLP

[57] ABSTRACT

Method and apparatus for detecting the presence of a semi-compliant PCI device in a secondary expansion slot of a PC and instructing the user to reinsert the device into one of the primary slots are disclosed. In one embodiment, upon detection of a semi-compliant PCI device in a secondary slot, a video image instructing the user to reinsert the device into one of the primary slots is displayed on a display of the PC. Operation remains suspended until the device is relocated to a primary slot. In a presently preferred embodiment, a hardware enhancement to a PCI-to-PCI bridge connecting a primary PCI bus to a secondary BCI bus enables the device to operate flawlessly on the secondary PCI bus, such that the user remains unaware of the otherwise undesirable situation.

24 Claims, 2 Drawing Sheets

TECHNIQUE FOR SUPPORTING SEMI-COMPLIANT PCI DEVICES BEHIND A PCI-TO-PCI BRIDGE

This is a divisional of copending application Ser. No. 08/590,461 filed on Jan. 23, 1996.

TECHNICAL FIELD

The invention relates generally to semi-compliant PCI devices and, more particularly, to a technique for supporting such devices behind a PCI-to-PCI bridge.

BACKGROUND OF THE INVENTION

It is well known that the number of devices that can be supported on a single peripheral component interconnect, or "PCI," bus is limited. In particular, the number of device loads that can be connected to one such bus is, under normal circumstances, approximately ten. Typically, one load is allocated for a motherboard device and two loads each are allocated for expansions slots. In conventional PC systems, three of the ten loads are typically used for three motherboard-based devices, respectively, one load is allocated to a riser connector, when a riser card implementation is used to support expansion slots is used, leaving six loads for three expansion slots into which expansion cards can be plugged. Accordingly, to enable more than two or three PCI expansion slots to be supported on a single PC, it has been known include in a PC an additional PCI bus (the "secondary PCI bus"), which is connected to the first PCI bus (the "primary PCI bus") via a device commonly designated as a PCI-to-PCI bridge.

A PCI-to-PCI bridge is typically implemented as an integrated circuit ("IC") chip connected to a primary PCI bus in front of the bridge and forming a secondary PCI bus behind the bridge. The bridge only takes up one device load on the primary bus and provides for an additional ten device loads behind the bridge via the secondary bus. These additional loads are almost totally electrically isolated from the primary bus.

FIG. 1 illustrates a PC 10 comprising a typical PCI configuration wherein a PCI-to-PCI bridge 12 is used to increase the number of PCI devices that can be supported. In particular, the PC 10 includes a host 14, which will include a host CPU, system memory, and ROM BIOS, residing on a host bus 16. The host bus 16 is connected to a primary PCI bus 18 via a host-to-PCI bridge 20. The primary PCI bus 18 is further connected to a secondary PCI bus 22, on which a display 23 resides, via the PCI-to-PCI bridge 12. In the illustrated embodiment, a single PCI device 26 resides on the primary PCI bus 18. In addition, two primary expansion slots 28a, 28b, for enabling additional PCI devices to be connected to the primary PCI bus 18, are provided thereon. Similarly, two PCI devices 32, 34, reside directly on the secondary PCI bus 22 and three secondary expansion slots 36a–36c are provided on the secondary PCI bus 22.

It should be understood that more than the number of expansion slots shown in FIG. 1 may be connected to the buses 18 and 22. Moreover, although not shown, will be recognized that the slots 28a–28b, 36a–36c, may be connected to the respective bus 18, 22, via an appropriate riser card.

In operation, each PCI 2.x-compliant device, such as the devices 26, 32 and 34, residing on a PCI bus requests a certain address range through which other devices can access the PCI device. Each device requests some number of consecutive addresses and the host 14 assigns chunks of the I/O space to the device. For example, if the device 26 requests a 256 byte address space, the host 14 may assign the device the contiguous address space beginning at address FEECh. The device 26 will then use the assigned address as a base, or lower, address limit and the assigned address plus 256 bytes as the upper address limit. Thereafter, any writes to or reads from this I/O space will be claimed by the device 26 and the device 26 will respond appropriately. A PCI-to-PCI bridge, such as the bridge 12, being a PCI device, operates in the same fashion. Specifically, it requests a contiguous address space, in particular, 4K, for its address space. The bridge 12 then divides this space and issues segments of it to the devices residing on the secondary PCI bus 22, such as devices 32, 34, and slots 36a–36c. In this manner, each device and slot that resides on the secondary bus 22 will be assigned its own address space comprising part of the address space assigned to the bridge 12.

When a device on the primary PCI bus 18, such as the device 26, wants to communicate with a device on the secondary PCI bus 22, such as the device 32, the device 26 will attempt to write to or read from the address space assigned to the bridge 12 and allocated by the bridge 12 to the device 32. The bridge 12 will accept the transaction and forward it to the device 32.

There are certain problems inherent in the use of a conventional PCI-to-PCI bridge in the manner described above. First, there are many PCI devices, in particular video cards and IDE cards, that are not completely PCI compliant. Such devices are hereinafter referred to as "semi-compliant PCI devices." Semi-compliant PCI devices have inherited an addressing scheme from the industry standard architecture ("ISA") standard that allows an expansion card to specify a noncontiguous address space. In addition, semi-compliant PCI devices have designated addresses that do not apply to the PCI remapping feature as defined by PCI 2.x specifications. Because PCI-to-PCI bridges that are currently commercially available only allocate to themselves a single contiguous I/O address range and cannot selectively accept certain single noncontiguous addresses, semi-compliant devices will not operate properly behind current PCI-to-PCI bridges. Moreover, although current PCI-to-PCI bridges do possess a special feature that enables them selectively to forward certain noncontiguous addresses in the VGA space according to the VGA specification, they lack two or more addresses that are not in the specification, but that most video devices require. As a result, the behavior observed by a user as a result of plugging a video card into one of the secondary expansion slots 36a–36c, which are generally externally indistinguishable from the primary expansion slots 28a, 28b, would be a lack of a video image; i.e., a blank screen. Clearly, this is an unacceptable result.

Additionally, some PCI devices, although capable of functioning behind a PCI-to-PCI bridge, incur a performance penalty in doing so. This is primarily due to the fact that any data must go through an intermediate device (i.e., the bridge 12) on the way to and from the device, thereby resulting in a latency. For ease of discussion, such devices will also be referred to herein as "semi-compliant PCI devices." Unless notified, a user might remain unaware that the device would operate more efficiently if inserted in one of the primary PCI slots.

Therefore, what is needed is a technique for detecting the insertion of a semi-compliant PCI device into a secondary expansion slot and instructing regarding same.

SUMMARY OF THE INVENTION

The present invention, accordingly, provides a method and apparatus for detecting the presence of a semi-compliant PCI device in a secondary expansion slot of a PC and instructing the user to reinsert the device into one of the primary slots, thereby overcoming or reducing disadvantages and limitations associated with prior methods and systems. In one embodiment, upon detection of a semi-compliant PCI device in a secondary slot, a video image instructing the user to reinsert the device into one of the primary slots is displayed on a display of the PC. Operation of the device will remain disabled until it is moved to a primary slot.

In other alternative embodiments, the user may be directed to move the semi-compliant PCI device from a secondary slot to a primary slot via a visual indicator, such as an illuminated LED, or an audio indicator, such as a series of beeps or instructions. As with the embodiment described above, operation of the device will remain disabled until it is moved to a primary slot.

In another, and presently preferred, embodiment, the invention comprises a hardware enhancement to a PCI-to-PCI bridge that allows fine grain programmable control of a set of I/O address ranges. In one embodiment, the enhancement circuit comprises four register sets, each set comprising a base and a limit register, for enabling a user to program several I/O ranges, and a configuration register for indicating a mode of operation of the circuit. When an address received by the PCI-to-PCI bridge lies within the I/O range defined by any one of the register sets, the action taken is determined by the mode indicated by the configuration register. In particular, if the configuration register indicates a first mode of operation, the I/O cycle is simply forwarded by the bridge. In contrast, if the configuration register indicates a second mode of operation, an interrupt is generated on an interrupt pin of the chip, allowing the BIOS to handle an exception. In this embodiment, it is possible for use of a semi-compliant PCI device to be enabled without requiring its relocation to a primary slot.

A technical advantage achieved with the invention is that it helps to insure that a user is made aware of the fact that a device that is inoperable behind a PCI-to-PCI bridge, such as most video cards, should be moved to a primary PCI expansion slot to enable use thereof.

Another technical advantage achieved with the invention is that it ensures that a user is made aware of the fact that certain devices, when plugged into a secondary PCI expansion slot do not function as efficiently as they would if plugged into a primary slot.

Yet another technical advantage achieved with the invention is that, in the preferred embodiment, it enables a video card to be used from a secondary PCI expansion slot.

DESCRIPTION OF THE PREFERRED EMBODIMENTS

Figure 1:
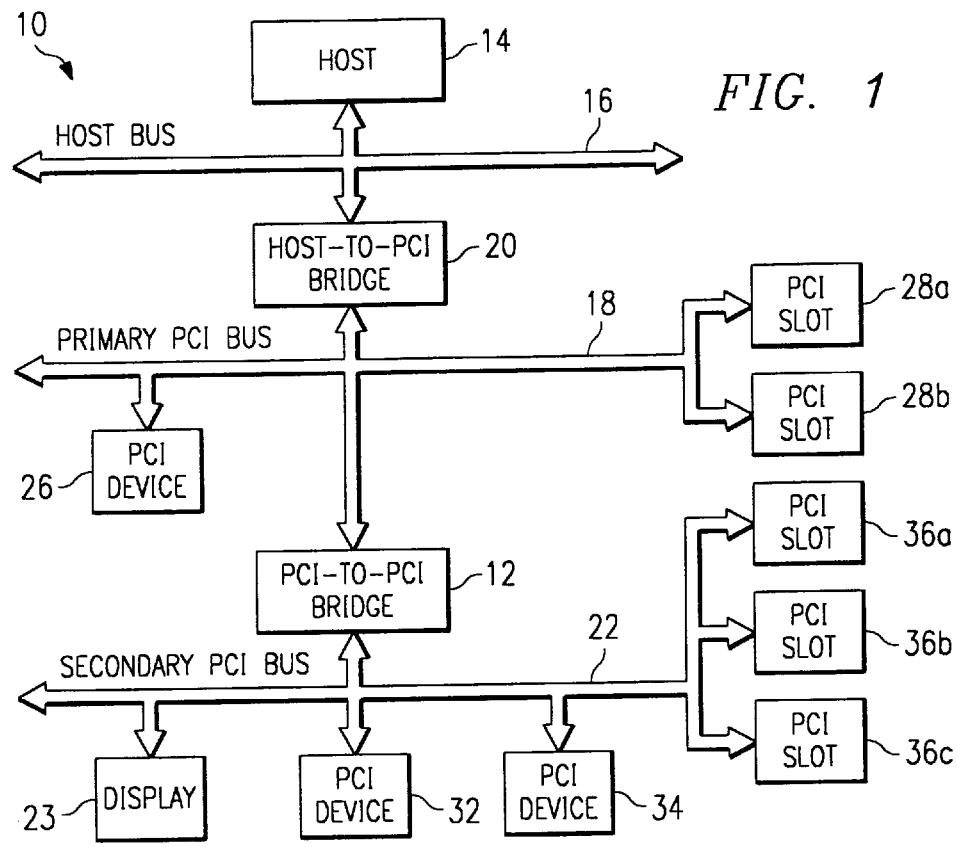
FIG. 1 is a system block diagram of a PC comprising a conventional PCI bus configuration.

As described above, FIG. 1 is a system block diagram of a PC 10 comprising a conventional PCI bus configuration.

Figure 3:
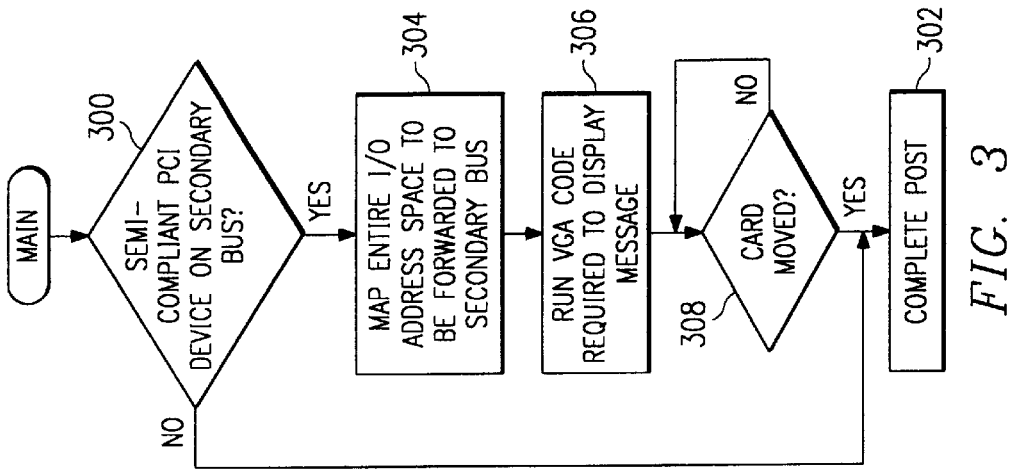
FIG. 3 is a flowchart illustrating an alternative method of implementing the technique of the present invention.
Figure 2B:
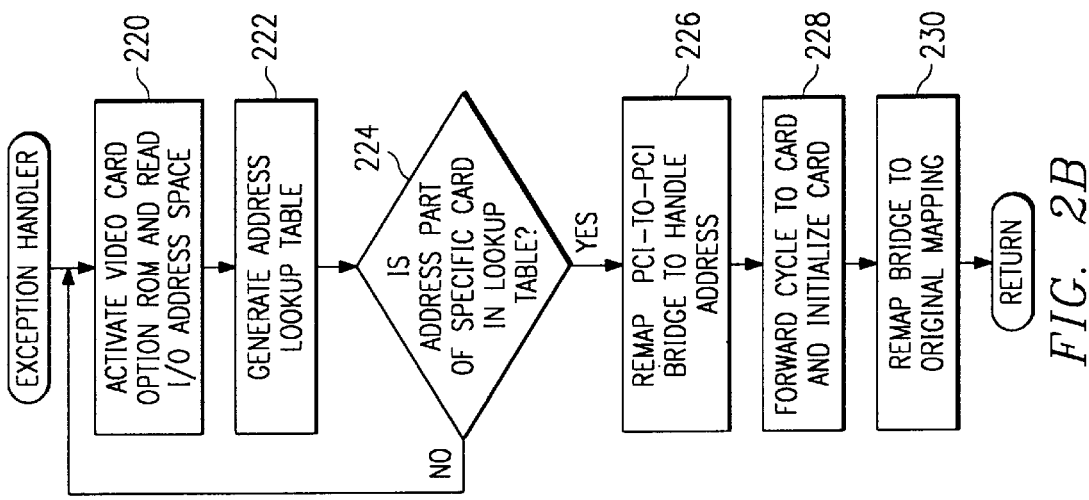
FIGS. 2A and 2B are flowcharts illustrating a first method of implementing the technique of the present invention for detecting the presence of a semi-compliant PCI device in a secondary expansion slot and responding to same.
Figure 2A:
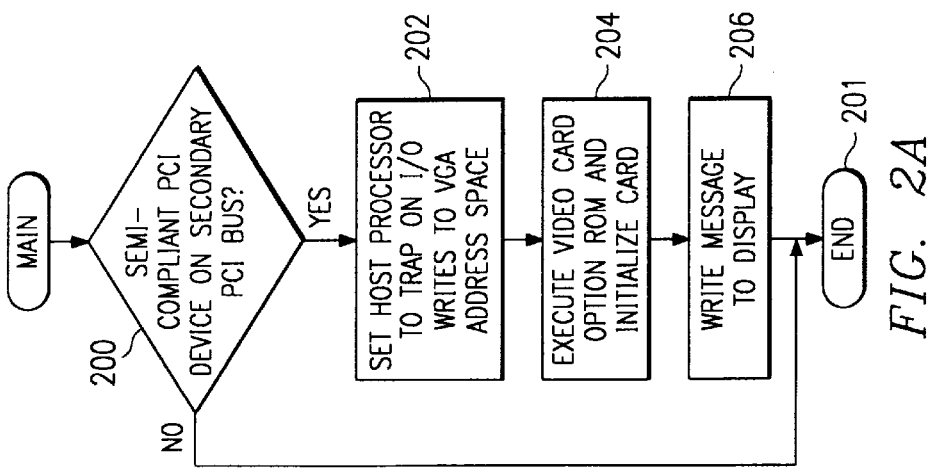

Referring now to FIGS. 2A and 2B, a flowchart of a method of detecting the presence of a semi-compliant PCI device in a secondary expansion slot and informing the user of this condition via a video image or other indicator. In particular, the method illustrated in FIGS. 2A and 2B utilizes an exception handler to detect that a semi-compliant PCI device is plugged into one of the secondary slots 36a–36c and instruct the user to move the device from the secondary slot to one of the primary slots 28a, 28b. It will be appreciated that instructions for execution by the host processor for implementing the method illustrated in FIGS. 2A and 2B, as well as the method illustrated in FIG. 3, are stored in a memory device of the PC 10.

In step 200, during POST of the PC 10, a determination is made whether there is a non-compliant PCI device, specifically, a video card, on the secondary bus 22. If not, execution of the routine terminates in step 201 and POST proceeds as usual; otherwise, execution proceeds to step 202. In step 202, the host processor of the host 14 is set to trap on I/O writes to VGA address space. As a result of this step, any attempted write cycle to VGA address space will result in the execution of an exception handler, described in detail with reference to FIG. 2B. In step 204, an option, or BIOS, ROM (not shown) of the detected video card is executed and the card is initialized. In step 206, a message instructing the user to remove the video card from the secondary expansion slot and reinsert it into a primary expansion slot is displayed on the display 15. Operation remains suspended until the card is moved, it being understood that the PC 10 must be turned off prior to moving the card. Execution of the routine then terminates in step 201.

As previously indicated, as a result of step 202, any attempted write cycle to an address in the VGA address space will result in the execution of an exception handler, the operation of which will now be described with reference to FIG. 2B. In step 220, the option ROM of the video card is activated and the I/O address space thereof is read. In step 222, an address look-up table is generated. In step 224, a determination is made whether the address of the write cycle is part of the address space of the card as specified in the look-up table. If not, execution returns to step 220; otherwise, execution proceeds to step 226, in which the bridge 12 is remapped to handle the address. In step 228, the cycle is forwarded to the video card and the card is initialized and in step 230, the bridge 13 is remapped to its original mapping. Finally, in step 232, a return from exception is executed.

In this manner, the video card may be initialized and used to instruct the user, via a message displayed on the display 15, to move the video card to a primary expansion slot 28a, 28b, before further use of the PC 10.

As shown in FIG. 3, in an alternative embodiment, during POST, a determination is made in step 300 whether a semi-compliant PCI device is detected in a secondary expansion slot 36a–36c. This step may be performed, for example, by comparing the identity of cards in the secondary PCI slots 36a–36c with a list of semi-compliant PCI card stored in a memory device of the host 14. In this manner, any device that is not capable of functioning, or that is capable of functioning, but not optimally, behind the bridge 12, may be identified in the list and designated as "semi-compliant." If in step 300, a semi-compliant PCI device is not detected in any of the slots 36a–36c, execution of the routine terminates in step 302 and POST is completed in the normal fashion. Otherwise, execution proceeds to step 304, in which the entire address space is remapped so that it is forwarded to the secondary bus 22 via the bridge 12. In step 306, a segment of VGA code stored in the memory of the host 14 is executed to display a message prompting the user to move the device from the secondary slot to a primary expansion slot. In step 308, a determination is made whether the device has been moved. If so, execution proceeds to step 302 and POST is completed; otherwise, execution remains at step 308 until the device is moved from the secondary slot. It will be recognized that, in operation, the solution illustrated in FIG. 3 will requires a bypass such that, in case the detected device is in fact fully PCI compliant, the user can boot the PC normally without being forced to moving the device.

Figure 4:
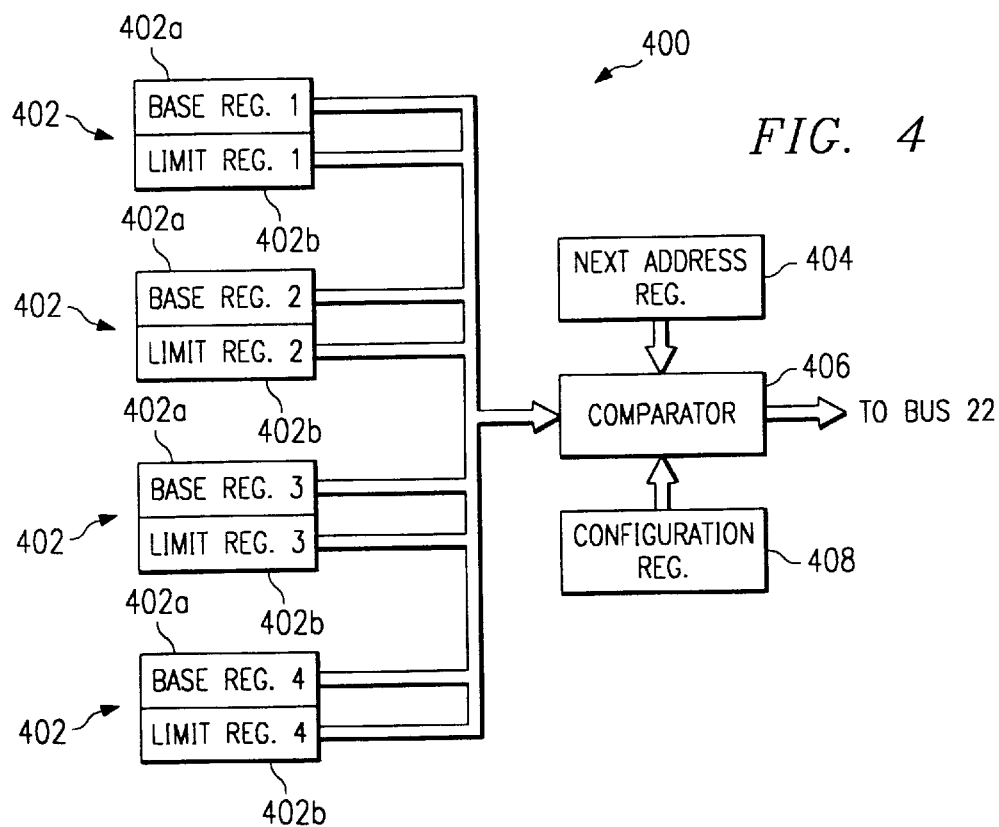
FIG. 4 is a block diagram of a hardware configuration embodying a preferred implementation of the present invention.

In a presently preferred alternative embodiment, the technique of the present invention is implemented using a hardware enhancement to the PCI-to-PCI bridge 12. As shown in FIG. 4, an enhancement circuit 400 for the PCI-to-PCI bridge 12 (FIG. 1) comprises a plurality of register sets 402, each of which includes a base register 402a and a limit register 402b. The base and limit registers 402a, 402b, of each set 402 may be programmed in a conventional manner to define an I/O address range. Although the enhancement circuit 400 shown in FIG. 4 comprises four register sets 402, it will be recognized that other numbers of register sets may be provided, depending on the particular embodiment of the PC 10.

Each I/O address received by the bridge 12 is stored in a next address register 404 and supplied to a comparator 406, which compares the next address from the register 404 with the I/O ranges defined by the register sets 402. If the next address falls within one of the defined I/O ranges, the next action taken will be determined by the contents of a configuration register 408, which register indicates, as two bits, a mode of operation for each of the register sets 402 individually. In particular, if the configuration register 408 contents indicate a first mode of operation (e.g., 01) for the register set 402 defining the I/O range in which the next address lies, the received I/O cycle is simply forwarded to the bus 22. Alternatively, if the configuration register contents correspond to a second mode of operation (e.g., 10) for the register set defining the I/O range in which the next address lies, an interrupt is generated on an interrupt pin (not shown) of the chip comprising the bridge 12 (FIG. 1), allowing the BIOS (FIG. 1, host 14) to handle an exception.

It will be recognized by those skilled in the art that the second mode of operation (i.e., the interrupt method) can be used to achieve an arbitrary granularity, as any I/O range can be mapped and software can handle selecting a finer granularity, independent of the operating system.

However, this method incurs a large performance hit, as it requires software intervention. In contrast, while the first mode of operation (i.e., the forwarding method) has a limited granularity, as a limited number of register sets 402 are used to define I/O ranges to be forwarded, it enables better and faster performance, as it is implemented completely in hardware and requires no software intervention.

It is understood that the present invention can take many forms and embodiments, the embodiments shown herein are intended to illustrate rather than limit, the invention, it being understood that variations may be made without departing from the spirit of the scope of the invention. For example, upon detection of a semi-compliant PCI device on the secondary PCI bus, the user could be instructed to move the device to the primary PCI bus in some manner other than via the display, such as illumination of an LED designated for that purpose or via an audio message. In addition, the present invention could be used in cases where the semi-compliant PCI device detected on the secondary bus, while not completely inoperable, would operate more efficiently on the primary bus, in which case the user could be informed, via a video or audio message or visual indicator, that the device would function better if moved to the primary bus.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a processor and a primary peripheral component interconnect ("PCI") bus electrically connected to a secondary PCI bus via a PCI-to-PCI bridge, a method comprising;

during a power on self test ("POST") of said computer, detecting a semi-compliant PCI device on said secondary PCI bus;

responsive to said detecting, causing said processor to trap on I/O writes to VGA address space, such that any attempted write cycle to said VGA address space will result in execution of an exception handler to notify a user to move said semi-compliant PCI device from said secondary PCI bus to said primary PCI bus;

suspending execution of said POST until said semi-compliant PCI device has been removed from said secondary PCI bus; and completing said POST routine upon removal of said semi-compliant device from said secondary PCI bus.

2. The method of claim 1 wherein said notifying comprises displaying a video message on a display of said computer.

3. The method of claim 1 wherein said semi-compliant PCI device comprises a video card.

4. The method of claim 3 wherein said execution of said exception handler comprises:

activating an option ROM of said video card and reading an I/O address space thereof;

determining whether an address of said write cycle is part of an address space of said video card;

if said write cycle address is part of said address space of said video card, remapping said PCI-to-PCI bridge from an original mapping to handle said write cycle address and forwarding said write cycle to said video card.

5. The method of claim 4 wherein said execution of said exception handler further comprises generating an address look-up table, wherein said determining whether an address of said write cycle is part of an address space of said video card comprises determining whether said write cycle address is specified in said address look-up table.

6. The method of claim 4 wherein said execution of said exception handler further comprises:

initializing said video card; and remapping said PCI-to-PCI bridge to said original mapping.

7. In a computer comprising a processor and a primary peripheral component interconnect ("PCI") bus electrically connected to a secondary PCI bus via a PCI-to-PCI bridge, an apparatus comprising:

means for detecting a semi-compliant PCI device on said secondary PCI bus during a power on self test ("POST") of said computer;

means responsive to said detecting, for causing said processor to trap on I/O writes to VGA address space, such that any attempted write cycle to said VGA address space will result in execution of an exception handler to notify a user to move said semi-compliant PCI device from said secondary PCI bus to said primary PCI bus;

means for suspending execution of said POST until said semi-compliant PCI device has been removed from said secondary PCI bus; and means for competing said POST routine upon removal of said semi-compliant device from said secondary PCI bus.

8. The apparatus of claim 7 wherein said notifying means comprises a video message displayed on a display of said computer.

9. The apparatus of claim 7 wherein said semi-compliant PCI device comprises a video card.

10. The apparatus of claim 9 wherein said execution of said exception handler comprises:

activating an option ROM of said video card and reading an I/O address space thereof;

determining whether an address of said write cycle is part of an address space of said video card;

if said write cycle address is part of said address space of said video card, remapping said PCI-to-PCI bridge from an original mapping to handle said write cycle address and forwarding said write cycle to said video card.

11. The apparatus of claim 10 wherein said execution of said exception handler further comprises generating an address look-up table, wherein said determining whether an address of said write cycle is part of an address space of said video card comprises determining whether said write cycle address is specified in said address look-up table.

12. The apparatus of claim 10 wherein said execution of said exception handler further comprises:

initializing said video card; and remapping said PCI-to-PCI bridge to said original mapping.

13. In a computer comprising a processor and a primary peripheral component interconnect ("PCI") bus electrically connected to a secondary PCI bus via a PCI-to-PCI bridge, a computer program stored on computer-readable media comprising:

instructions for detecting a semi-compliant PCI device on said secondary PCI bus during a power on self test ("POST") of said computer;

instructions responsive to said detecting for causing said processor to trap on I/O writes to VGA address space, such that any attempted write cycle to said VGA address space will result in execution of an exception handler to notify a user to move said semi-compliant PCI device from said secondary PCI bus to said primary PCI bus; and instructions for allow said POST routine to be completed only upon removal of said semi-compliant device from said-secondary bus.

14. The program of claim 13 wherein said instructions for notifying comprise instructions for displaying a video message on a display of said computer.

15. The program of claim 13 wherein said semi-compliant PCI device comprises a video card.

16. The program of claim 15 wherein said execution of said exception handler comprises:

activating an option ROM of said video card and reading an I/O address space thereof;

determining whether an address of said write cycle is part of an address space of said video card;

if said write cycle address is part of said address space of said video card, remapping said PCI-to-PCI bridge from an original mapping to handle said write cycle address and forwarding said write cycle to said video card.

17. The program of claim 15 wherein said execution of said exception handler further comprises generating an address look-up table, wherein said determining whether an address of said write cycle is part of an address space of said video card comprises determining whether said write cycle address is specified in said address look-up table.

18. The program of claim 15 wherein said execution of said exception handler further comprises:

initializing said video card; and remapping said PCI-to-PCI bridge to said original mapping.

19. In a computer comprising a processor and a primary peripheral component interconnect ("PCI") bus electrically connected to a secondary PCI bus via a PCI-to-PCI bridge, a method comprising:

during a power on self test ("POST") of said computer, detecting a semi-compliant PCI device on said secondary PCI bus;

responsive to said detecting, suspending execution of said POST and remapping an address space of said computer such that a write cycle to any address in said address space is forwarded to said secondary PCI bus via said PCI-to-PCI bridge;

executing a segment of VGA code stored in a memory of said computer to display a message prompting a user to remove said semi-compliant PCI device from said secondary PCI bus; and recommencing execution of said POST upon detection of removal of said semi-compliant PCI device from said secondary PCI bus.

20. The method of claim 19 wherein said semi-compliant PCI device is a video card.

21. In a computer comprising a processor and a primary peripheral component interconnect ("PCI") bus electrically connected to a secondary PCI bus via a PCI-to-PCI bridge, an apparatus comprising:

means for detecting a semi-compliant PCI device on said secondary PCI bus during a power on self test ("POST") of said computer;

means responsive to said detecting for suspending execution of said POST and remapping an address space of said computer such that a write cycle to any address in said address space is forwarded to said secondary PCI bus via said PCI-to-PCI bridge;

means for executing a segment of VGA code stored in a memory of said computer to display a message prompting a user to remove said semi-compliant PCI device from said secondary PCI bus; and means for recommencing execution of said POST upon detection of removal of said semi-compliant PCI device from said secondary PCI bus.

22. The apparatus of claim 21 wherein said semi-compliant PCI device comprises a video card.

23. In a computer comprising a processor and a primary peripheral component interconnect ("PCI") bus electrically connected to a secondary PCI bus via a PCI-to-PCI bridge, an computer program stored on computer-readable medium comprising:

instructions for detecting a semi-compliant PCI device on said secondary PCI bus during a power on self test ("POST") of said computer;

instructions responsive to said detecting for suspending execution of said POST and remapping an address space of said computer such that a write cycle to any address in said address space is forwarded to said secondary PCI bus via said PCI-to-PCI bridge;

instructions for executing a segment of VGA code stored in a memory of said computer to display a message prompting a user to remove said semi-compliant PCI device from said secondary PCI bus; and instructions for recommencing execution of said POST upon detection of removal of said semi-compliant PCI device from said secondary PCI bus.

24. The program of claim 23 wherein said semi-compliant PCI device comprises a video card.

* * * * *

UNITED STATES PATENT AND TRADEMARK OFFICE
CERTIFICATE OF CORRECTION

PATENT NO.    : 5,878,238
DATED         : March 2, 1999
INVENTOR(S)   : Doron Gan and Jeff Savage It is certified that error appears in the above-identified patent and that said Letters Patent is hereby corrected as shown below:

<u>Column 7,</u>
Line 58, please delete the word "allow" and insert therefor -- allowing --

Signed and Sealed this

Eighth Day of October, 2002

*Attest:*

*Attesting Officer*

JAMES E. ROGAN
*Director of the United States Patent and Trademark Office*